United States Patent Office

3,444,118
Patented May 13, 1969

3,444,118
DRY TINTING COMPOSITION FOR WATER-BASED OR WATER-THINNABLE COATING COMPOSITIONS AND METHOD OF TINTING WITH SAID TINTING COMPOSITION
Laurence F. Saunders, Highlands, Salisbury, Southern Rhodesia, assignor to Vitretex (Central Africa) Limited, Salisbury, Southern Rhodesia
No Drawing. Filed Aug. 10, 1964, Ser. No. 388,661
Int. Cl. C09d 5/02; C08f 1/08
U.S. Cl. 260—29.2       3 Claims

ABSTRACT OF THE DISCLOSURE

Compositions comprising a major proportion of inorganic pigment and a minor proportion of a compound which produces carbon dioxide when in contact with water are added to water and thoroughly admixed with a water-compatible basic coating composition.

---

This invention relates to water-based emulsion or water-thinnable, or emulsifiable coating compositions and provides for the tinting of such compositions by the incorporation therein of pigments, more especially inorganic pigments, of requisite colour in such a form and manner as to avoid streaking or colour development in the tinted product as required by the painter.

According to this invention water-dispersible inorganic pigment of fine particle size suitable for tinting compositions as above is provided in dry powdered association with chemical substances which when contacted with water react to give rise to effervescence therein.

The selected inorganic pigment or pigments provided in accordance with the preceding paragraph may have a particle size of some 50 microns and preferably smaller. The associated substances are so selected that the reaction products are innocuous to the pigment and other constituents of the basic composition which is to be tinted.

The release of gas under effervescence in contact with the water causes deflocculation of the pigment agglomerates. This results in a fine pigment dispersion which, when mixed with a basic coating composition, will tint it and show no signs of streaking or colour development.

In a convenient example, the dry tinting pigment and its associated substances may be as follows:

|  | Parts |
|---|---|
| Inorganic pigment (such as yellow ochre or red oxide) (less than 50 micron size) | 80 to 95 |
| Citric acid | 8 to 2 |
| Sodium bicarbonate | 12 to 3 |

The above materials are thoroughly mixed and passed through a pulveriser to obtain homogeneity and ensure that the additives will not settle out on standing.

When this dry mixture is added to water, carbon dioxide is released, which causes the deflocculation of the pigment agglomerates.

In a modified example, tartaric acid may be used in place of citric acid, with a like result.

The invention, it is to be understood, extends not only to the dry effervescible mixture containing the tinting pigment or pigments as above but also to the tinting method itself which comprises the addition of such admixture to the basic composition with any necessary addition of water for obtaining the effervescent action and the consequent expeditious and homogeneous dispersal of the tinting pigment or pigments throughout the resultant tinted product.

USES

(1) The main use of this system is as a "Dry Tinting System," using the tinting mixture in packet or pouch form, the method being e.g. as follows:

Various types of water-based or water-thinnable paints (e.g. P.V.A. Paints, acrylic paints, resin emulsion paints, water soluble enamels) are prepared and standardized so that when filled into a tin at a fixed weight, a repeatable colour is obtained when a predetermined quantity of dry tinter is added according to instructions.

Dry tinters, prepared as per the foregoing examples, are intermixed at the factory to give the desired colour and are sealed into pouches at a predetermined weight. The quantities are sufficient for tinting ¼ gallon, ½ gallon or 1 gallon tins of the various "Tinting Bases," and the pouches are marked with the colour name.

The instructions supplied with the pouches may read thus:

(A) Check colour name on pouch to ensure you have the right colour.

(B) For ½ gallon, 1 bag is required, so if you have 1 gallon of base paint make sure you have two pouches of the same colour name.

(C) Take your tin of "Tinting Base" and remove the lid. Add approximately 1 to 1½ cupfuls of water to the contents without mixing.

(D) Cut open the pouch or pouches and sprinkle the dry powder contents into the added water, making sure that all the powder has been removed. A reaction will then take place dispersing the dry tinter in the water. Now replace the lid and then shake the tin vigorously for about 15 seconds.

(E) Finally, stir in such additional water as may be required for ease of application.

The advantage of this system is that only the "Tinting Bases" need be kept in stock, together with the various colours in pouches. When a particular colour is required, it is obtained by adding the appropriate dry tinter to the base and mixing according to instructions.

(2) This same system can be used for bulk factory production where a fixed weight of the dry tinter can be added to a batch of base to give a coating composition of predetermined colour. This eliminates the time taken up in tinting the batch in the normal manner.

In order to achieve certain shades, percentages of organic pigments, themselves suitably treated for dispersion in water, may be included in dry admixture with the dry inorganic effervescible tinting mixtures.

The invention is not limited either to the use of specific chemical compounds or substances or by the foregoing description in which such are named. As will be understood by those skilled in the chemical art, effervescence in water suitable for the purpose of this invention may be obtained by reaction of other correctly selected reagents such as are embraced within the scope of the appended claims by which alone the invention is limited.

I claim:
1. A dry tinting composition consisting essentially of a homogeneous mixture of 80 to 95 parts by weight of an inorganic pigment having a particle size of less than 50 microns, and an effervescent combination of 2 to 8 parts by weight of organic acid, and 3 to 12 parts by weight of alkali metal carbonate salt.

2. A composition consisting essentially of from 80 to 95 parts of inorganic pigment having a particle size of less than 50 microns, 2 to 8 parts of citric or tartaric acid and 3 to 12 parts of sodium bicarbonate.

3. In the tinting of an unpigmented water-based or water-thinnable paint, the improvement wherein a mixture containing 80–95 parts of an inorganic pigment having a particle size of less than 50 microns and an effervescent coupling combination of 2 to 8 parts of citric or tartaric acid and 3 to 12 parts of sodium bicarbonate is added to water, whereupon the inorganic pigment is dispersed in said water by the evolution of the carbon dioxide gas generated from said effervescent coupling combination, and the resulting inorganic pigment dispersion is mixed with the unpigmented water-based or water-thinnable paint.

References Cited

UNITED STATES PATENTS

| | | | |
|---|---|---|---|
| 2,007,137 | 7/1935 | Abrams | 252—15 |
| 2,587,266 | 2/1952 | Wray et al. | 106—290 |
| 2,923,649 | 2/1960 | Todd | 106—193 |
| 738,481 | 9/1903 | Pope | 252—188.3 |

FOREIGN PATENTS 523,479   5/1956   Canada.

ALLAN LIEBERMAN, *Primary Examiner.*

U.S. Cl. X.R.

106—170, 287, 308; 260—29.6, 29.7